US012710592B2

(12) United States Patent
Deng et al.

(10) Patent No.: US 12,710,592 B2
(45) Date of Patent: Aug. 18, 2026

(54) WAVEGUIDE DEVICE AND OPTICAL ENGINE

(71) Applicant: HTC Corporation, Taoyuan City (TW)

(72) Inventors: Qing-Long Deng, Taoyuan City (TW); Chih-Ying Chen, Taoyuan City (TW)

(73) Assignee: HTC Corporation, Taoyuan City (TW)

(*) Notice: Subject to any disclaimer, the term of this patent is extended or adjusted under 35 U.S.C. 154(b) by 351 days.

(21) Appl. No.: 18/461,525

(22) Filed: Sep. 6, 2023

(65) Prior Publication Data

US 2024/0077677 A1 Mar. 7, 2024

Related U.S. Application Data

(60) Provisional application No. 63/403,873, filed on Sep. 6, 2022.

(51) Int. Cl.
*G02B 27/01* (2006.01)
*G02B 6/26* (2006.01)
*G03B 21/14* (2006.01)

(52) U.S. Cl.
CPC ............. *G02B 6/262* (2013.01); *G03B 21/14* (2013.01)

(58) Field of Classification Search
CPC .......... G02B 2027/0178; G02B 27/017; G02B 27/0172; G02B 2027/0174; G02B 6/0013; G02B 6/0015; G02B 6/0018; G02B 6/0016
See application file for complete search history.

(56) References Cited

U.S. PATENT DOCUMENTS

| | | | |
|---|---|---|---|
| 2006/0221448 | A1 | 10/2006 | Nivon et al. |
| 2015/0192725 | A1 | 7/2015 | Facke et al. |
| 2016/0238844 | A1 | 8/2016 | Dobschal |
| 2016/0313559 | A1 | 10/2016 | Yamada |
| 2019/0339447 | A1 | 11/2019 | Shipton et al. |
| 2020/0183162 | A1 | 6/2020 | Deng |
| 2020/0355862 | A1 | 11/2020 | Lane et al. |

(Continued)

FOREIGN PATENT DOCUMENTS

| | | |
|---|---|---|
| CN | 113075793 A | 7/2021 |
| CN | 114415275 A | 4/2022 |

OTHER PUBLICATIONS

The office action of the corresponding Taiwanese application No. TW112133857 issued on Jul. 3, 2024.

(Continued)

*Primary Examiner* — Ryan D Howard
(74) *Attorney, Agent, or Firm* — CKC & Partners Co., LLC

(57) ABSTRACT

A waveguide device includes a first diffractive element, a second diffractive element, a third diffractive element, and a waveguide element. The first diffractive element is configured to diffract light of a wavelength to propagate with a diffraction angle. The second diffractive element is configured to diffract the light of the wavelength to propagate with the diffraction angle. The third diffractive element is configured to diffract the light of the wavelength to propagate with the diffraction angle. The waveguide element is configured to guide the light of the wavelength to propagate from the first diffractive element to the second diffractive element and the third diffractive element. Diffraction efficiencies of the second diffractive element and the third diffractive element are different.

17 Claims, 6 Drawing Sheets

(56) References Cited

U.S. PATENT DOCUMENTS

2021/0055553 A1 2/2021 Chi et al.
2024/0036257 A1* 2/2024 Piper ...................... G02B 6/262

OTHER PUBLICATIONS

European Search Report of the European application 24186947.8 issued on Dec. 12, 2024.
The European extended search report of the corresponding European application No. 23195658.2 issued on Dec. 18, 2023.

* cited by examiner

WAVEGUIDE DEVICE AND OPTICAL ENGINE

CROSS-REFERENCE TO RELATED APPLICATION

This application claims priority to U.S. Provisional Application Ser. No. 63/403,873, filed on Sep. 6, 2022, which is herein incorporated by reference.

BACKGROUND

Technical Field

The present disclosure relates to a waveguide device and an optical engine.

Description of Related Art

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment. These devices, which can be implemented as head-mounted display (HMD) glasses or other wearable display devices, but are not limited thereto, often utilize optical waveguides to replicate an image to a location where a user of a device can view the image as a virtual image in an augmented reality environment. As this is still an emerging technology, there are certain challenges associated with utilizing waveguides to display images of virtual objects to a user.

Nowadays, many conventional waveguides with diffraction gratings attached thereon have been used. Each of the waveguides and the diffraction gratings attached thereon are used for transmitting a single color. As such, a conventional optical engine for providing projected images to an eye of a user usually requires a plurality of waveguides to transmit three primary colors, which is not conducive to the reduction of weight and thickness of the optical engine. In addition, since the diffraction gratings on the conventional waveguides are required to transmit the projected images with an expanded viewing angle, the efficiency is low.

Accordingly, it is an important issue for the industry to provide a waveguide device and an optical engine capable of solving the aforementioned problems.

SUMMARY

An aspect of the disclosure is to provide a waveguide device and an optical engine that can efficiently solve the aforementioned problems.

According to an embodiment of the disclosure, a waveguide device includes a first diffractive element, a second diffractive element, a third diffractive element, and a waveguide element. The first diffractive element is configured to diffract light of a wavelength to propagate with a diffraction angle. The second diffractive element is configured to diffract the light of the wavelength to propagate with the diffraction angle. The third diffractive element is configured to diffract the light of the wavelength to propagate with the diffraction angle. The waveguide element is configured to guide the light of the wavelength to propagate from the first diffractive element to the second diffractive element and the third diffractive element. Diffraction efficiencies of the second diffractive element and the third diffractive element are different.

In an embodiment of the disclosure, the first diffractive element is spaced apart from the second diffractive element and the third diffractive element.

In an embodiment of the disclosure, a distance between the first diffractive element and the second diffractive element is smaller than a distance between the first diffractive element and the third diffractive element. The diffraction efficiency of the second diffractive element is smaller than the diffraction efficiency of the third diffractive element.

In an embodiment of the disclosure, the waveguide element has opposite sides. The first diffractive element is disposed on one of the opposite sides. The second diffractive element and the third diffractive element are disposed on another of the opposite sides.

In an embodiment of the disclosure, the first diffractive element, the second diffractive element, and the third diffractive element are reflective diffractive elements.

In an embodiment of the disclosure, the waveguide device further includes a fourth diffractive element. The fourth diffractive element is configured to diffract the light of the wavelength to propagate with the diffraction angle. The second diffractive element, the third diffractive element, and the fourth diffractive element are disposed on a surface of the waveguide element and sequentially arranged along a direction. The diffraction efficiency of the third diffractive element is greater than the diffraction efficiency of the second diffractive element and smaller than a diffraction efficiency of the fourth diffractive element.

In an embodiment of the disclosure, the third diffractive element is seamlessly connected to the second diffractive element and the fourth diffractive element.

According to an embodiment of the disclosure, an optical engine includes a projector, a first diffractive element, a second diffractive element, a third diffractive element, and a waveguide element. The first diffractive element is configured to diffract the light of the wavelength to propagate with a diffraction angle. The second diffractive element is configured to diffract the light of the wavelength to propagate with the diffraction angle. The third diffractive element is configured to diffract the light of the wavelength to propagate with the diffraction angle. The waveguide element is configured to guide the light of the wavelength to propagate from the first diffractive element to the second diffractive element and the third diffractive element, wherein diffraction efficiencies of the second diffractive element and the third diffractive element are different.

In an embodiment of the disclosure, the first diffractive element is spaced apart from the second diffractive element and the third diffractive element.

In an embodiment of the disclosure, a distance between the first diffractive element and the second diffractive element is smaller than a distance between the first diffractive element and the third diffractive element. The diffraction efficiency of the second diffractive element is smaller than the diffraction efficiency of the third diffractive element.

In an embodiment of the disclosure, the light diffracted by the first diffractive element sequentially reaches the second diffractive element and the third diffractive element through the waveguide element. The diffraction efficiency of the second diffractive element is smaller than the diffraction efficiency of the third diffractive element.

In an embodiment of the disclosure, the waveguide element has opposite sides. The first diffractive element is disposed on one of the opposite sides. The second diffractive element and the third diffractive element are disposed on another of the opposite sides.

In an embodiment of the disclosure, the first diffractive element, the second diffractive element, and the third diffractive element are reflective diffractive elements.

In an embodiment of the disclosure, the optical engine further includes a fourth diffractive element. The fourth diffractive element is configured to diffract the light of the wavelength to propagate with the diffraction angle. The second diffractive element, the third diffractive element, and the fourth diffractive element are disposed on a surface of the waveguide element and sequentially arranged along a direction. The diffraction efficiency of the third diffractive element is greater than the diffraction efficiency of the second diffractive element and smaller than a diffraction efficiency of the fourth diffractive element.

In an embodiment of the disclosure, the third diffractive element is seamlessly connected to the second diffractive element and the fourth diffractive element.

In an embodiment of the disclosure, the light diffracted by the first diffractive element sequentially reaches the second diffractive element, the third diffractive element, and the fourth diffractive element through the waveguide element.

In an embodiment of the disclosure, the light projected by the projector reaches the first diffractive element through the waveguide element. The light reaching the first diffractive element is diffracted by the first diffractive element to sequentially reach the second diffractive element and the third diffractive element.

Accordingly, in some embodiments of the waveguide device and the optical engine of the present disclosure, the diffraction efficiencies of the second diffractive element and the third diffractive element increase as the energy of the totally reflected light decreases. In this way, the second diffractive element and the third diffractive element having different diffraction efficiencies can provide a wider eyebox range, and this range can provide a more uniform light intensity. It allows users to see uniformly bright and dark image content when laterally moving their eyes relative to the waveguide device and the optical engine.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
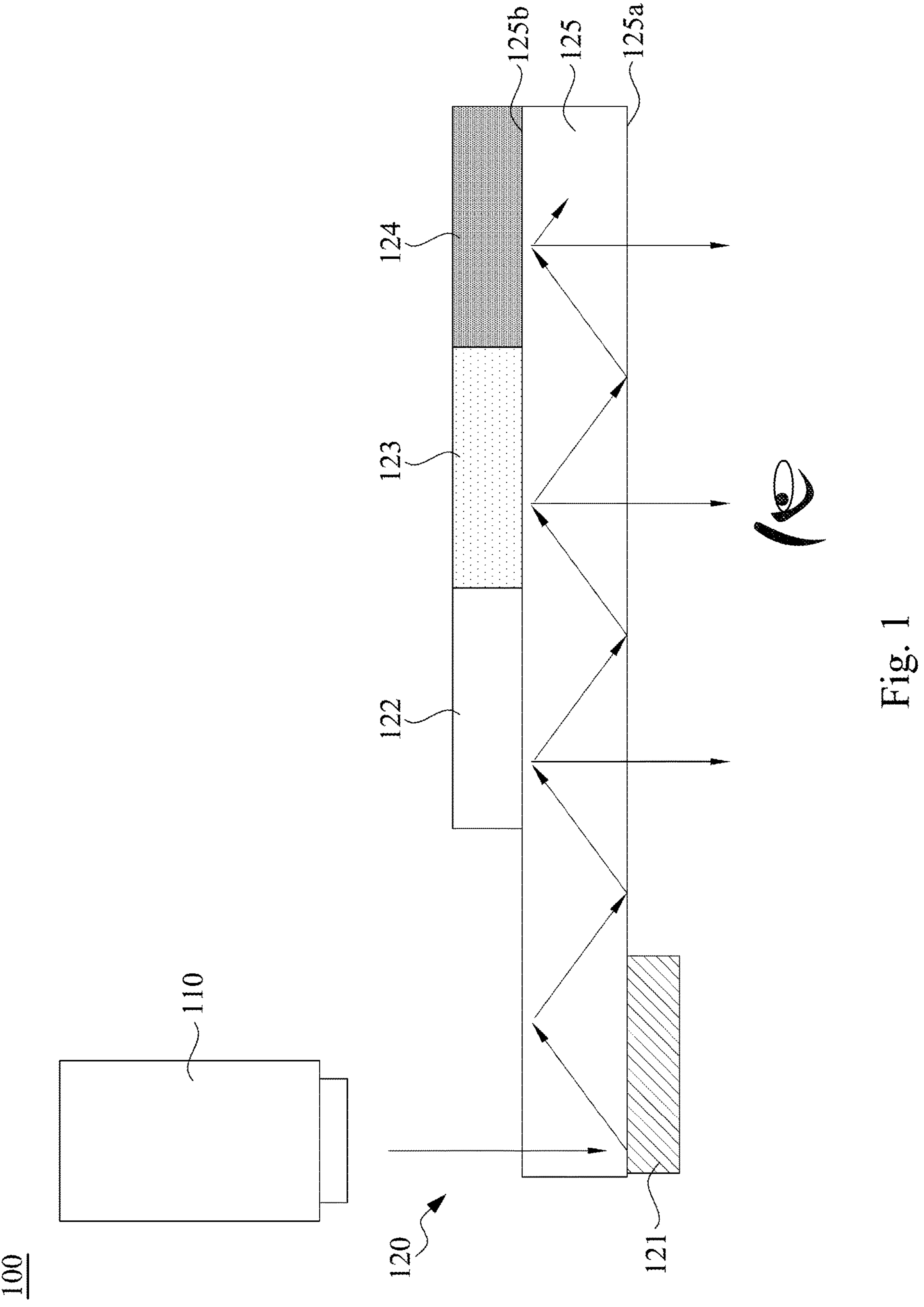
FIG. 1 is a schematic diagram of an optical engine according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic diagram of an optical engine 100 according to some embodiments of the present disclosure. As shown in FIG. 1, the optical engine 100 may be used in an augmented reality device (not shown) which can be implemented as head-mounted display (HMD) glasses or other wearable display devices, but is not limited thereto. The optical engine 100 includes a projector 110 and a waveguide device 120. The waveguide device 120 includes a first diffractive element 121, a second diffractive element 122, a third diffractive element 123, a fourth diffractive element 124, and a waveguide element 125. The projector 110 is configured to project light of a wavelength. The first diffractive element 121 is configured to diffract the light of the wavelength to propagate with a diffraction angle. The second diffractive element 122 is configured to diffract the light of the wavelength to propagate with the diffraction angle. The third diffractive element 123 configured to diffract the light of the wavelength to propagate with the diffraction angle. The fourth diffractive element 124 is configured to diffract the light of the wavelength to propagate with the diffraction angle. In some embodiments, to diffract the light of the wavelength to propagate with the diffraction angle, the first diffractive element 121, the second diffractive element 122, the third diffractive element 123, and the fourth diffractive element 124 may have holographic gratings having an identical fringe pitch.

In some embodiments, the projector 110 is configured to project red light R, green light G, and blue light B (referring to FIG. 5), but the disclosure is not limited in this regard. In some embodiments, the wavelength band of the red light R projected by the projector 110 is from about 622 nm to about 642 nm, but the disclosure is not limited in this regard. In some embodiments, the wavelength band of the green light G projected by the projector 110 is from about 522 nm to about 542 nm, but the disclosure is not limited in this regard. In some embodiments, the wavelength band of the blue light B projected by the projector 110 is from about 455 nm to about 475 nm, but the disclosure is not limited in this regard. In some embodiments, the projector 110 adopts light-emitting diodes to project the red light R, the green light G, and the blue light B. In practical applications, the projector 110 may adopt laser diodes to project the red light R, the green light G, and the blue light B with smaller wavelength band.

In some embodiments, the holographic gratings of the first diffractive element 121, the second diffractive element 122, the third diffractive element 123, and the fourth diffractive element 124 are configured to diffract the red light R projected by the projector 110 to propagate with a first range of diffraction angle. For example, the holographic gratings are configured to diffract light of which the wavelength is 632 nm (which is within the wavelength band of the red light R) to propagate with a first diffraction angle. In some embodiments, the holographic gratings are configured to diffract the green light G projected by the projector 110 to propagate with a second range of diffraction angle. For example, the holographic gratings are configured to diffract light of which the wavelength is 532 nm (which is within the wavelength band of the green light G) to propagate with a second diffraction angle. In some embodiments, the holographic gratings are configured to diffract the green light B projected by the projector 110 to propagate with a third range of diffraction angle. For example, the holographic gratings are configured to diffract light of which the wavelength is 465 nm (which is within the wavelength band of the blue light B) to propagate with a third diffraction angle.

In some embodiments, the holographic gratings of the first diffractive element 121, the second diffractive element 122, the third diffractive element 123, and the fourth diffractive element 124 are volume holographic gratings. It is notable that light diffracted by a volume holographic grating can propagate with a specific diffraction angle based on the Bragg's law.

As shown in FIG. 1, the waveguide element 125 is configured to guide the light of the wavelength to propagate from the first diffractive element 121 to the second diffractive element 122, the third diffractive element 123, and the fourth diffractive element 124 based on the principle of total reflection. In this way, the light projected by the projector 110 can be inputted to the first diffractive element 121 and outputted from the second diffractive element 122, the third diffractive element 123, and the fourth diffractive element 124. That is, the first diffractive element 121 serves as a light guiding element of light-input, and the second diffractive element 122, the third diffractive element 123, and the fourth diffractive element 124 serve as light guiding elements of light-output.

In some embodiments, diffraction efficiencies of the second diffractive element 122, the third diffractive element 123, and the fourth diffractive element 124 are different. Specifically, as shown in FIG. 1, the first diffractive element 121 is spaced apart from second diffractive element 122, the third diffractive element 123, and the fourth diffractive element 124. The waveguide element 125 has opposite sides 125*a*, 125*b*. The first diffractive element 121 is disposed on the side 125*a*. The second diffractive element 122, the third diffractive element 123, and the fourth diffractive element 124 are disposed on the side 125*b* and sequentially arranged along a direction substantially away from the first diffractive element 121. A distance between the first diffractive element 121 and the third diffractive element 123 is greater than a distance between the first diffractive element 121 and the second diffractive element 122 and smaller than a distance between the first diffractive element 121 and the fourth diffractive element 124, and the diffraction efficiency of the third diffractive element 123 is greater than the diffraction efficiency of the second diffractive element 122 and smaller than the diffraction efficiency of the fourth diffractive element 124.

In some other embodiments, the light projected by the projector 110 reaches the first diffractive element 121 through the waveguide element 125. The light reaching the first diffractive element 121 is diffracted by the first diffractive element 121 to sequentially reach the second diffractive element 122, the third diffractive element 123, and the fourth diffractive element 124 through the waveguide element 125, and the diffraction efficiency of the third diffractive element 123 is greater than the diffraction efficiency of the second diffractive element 122 and smaller than the diffraction efficiency of the fourth diffractive element 124.

For example, the diffraction efficiencies of the second diffractive element 122, the third diffractive element 123, and the fourth diffractive element 124 are about 33%, 50%, and 99%, respectively. In this way, with reference to FIG. 1, about 33% of the light propagated from the first diffractive element 121 to the second diffractive element 122 is diffracted by the second diffractive element 122 of which the diffraction efficiency is about 33%, while about 66% of the light is reflected and continues to reach the third diffractive element 123. About 33% of the light is diffracted by the third diffractive element 123 of which the diffraction efficiency is about 50%, while 33% of the light is reflected and continues to reach the fourth diffractive element 124. About 33% of the light is diffracted by the fourth diffractive element 124 of which the diffraction efficiency is about 99%, while less than 1% of the light is reflected.

With the aforementioned configurations, the second diffractive element 122, the third diffractive element 123, and the fourth diffractive element 124 having different diffraction efficiencies can provide a wider eyebox range, and this range can provide a more uniform light intensity. That is, a more consistent amount of light is obtained in the pupil area outside the waveguide element 125. It allows users to see uniformly bright and dark image content when laterally moving their eyes relative to the waveguide device 120 and the optical engine 100.

In practical applications, the number of light guiding elements of light-output may be flexibly adjusted. For example, in some embodiments, the fourth diffractive element 124 may be omitted, and the diffraction efficiencies of the second diffractive element 122 and the third diffractive element 123 may be adjusted to be about 50% and 99%, respectively. In this way, about 50% of the light propagated from the first diffractive element 121 to the second diffractive element 122 is diffracted by the second diffractive element 122 of which the diffraction efficiency is about 50%, while about 50% of the light is reflected and continues to reach the third diffractive element 123. About 50% of the light is diffracted by the third diffractive element 123 of which the diffraction efficiency is about 99%, while less than 1% of the light is reflected.

For example, in some embodiments, the waveguide device 120 further includes a fifth diffractive element (not shown) configured to diffract the light of the wavelength to propagate with the diffraction angle, and the diffraction efficiencies of second diffractive element 122, the third diffractive element 123, the fourth diffractive element 124, and the fifth diffractive element may be adjusted to be about 25%, 33%, 50%, and 99%, respectively. In this way, about 25% of the light propagated from the first diffractive element 121 to the second diffractive element 122 is diffracted by the second diffractive element 122 of which the diffraction efficiency is about 25%, while about 75% of the light is reflected and continues to reach the third diffractive element 123. About 25% of the light is diffracted by the third diffractive element 123 of which the diffraction efficiency is about 33%, while 50% of the light is reflected and continues to reach the fourth diffractive element 124. About 25% of the light is diffracted by the fourth diffractive element 124 of which the diffraction efficiency is about 50%, while 25% of the light is reflected and continues to reach the fifth diffractive element. About 25% of the light is diffracted by the fifth diffractive element of which the diffraction efficiency is about 99%, while less than 1% of the light is reflected.

As shown in FIG. 1, in some embodiments, the third diffractive element 123 is seamlessly connected to the second diffractive element 122 and the fourth diffractive element 124. That is, no gap is formed between the second diffractive element 122 and the third diffractive element 123 and between the third diffractive element 123 and the fourth diffractive element 124. In this way, the exit pupil image can be relatively continuous.

Figure 2:
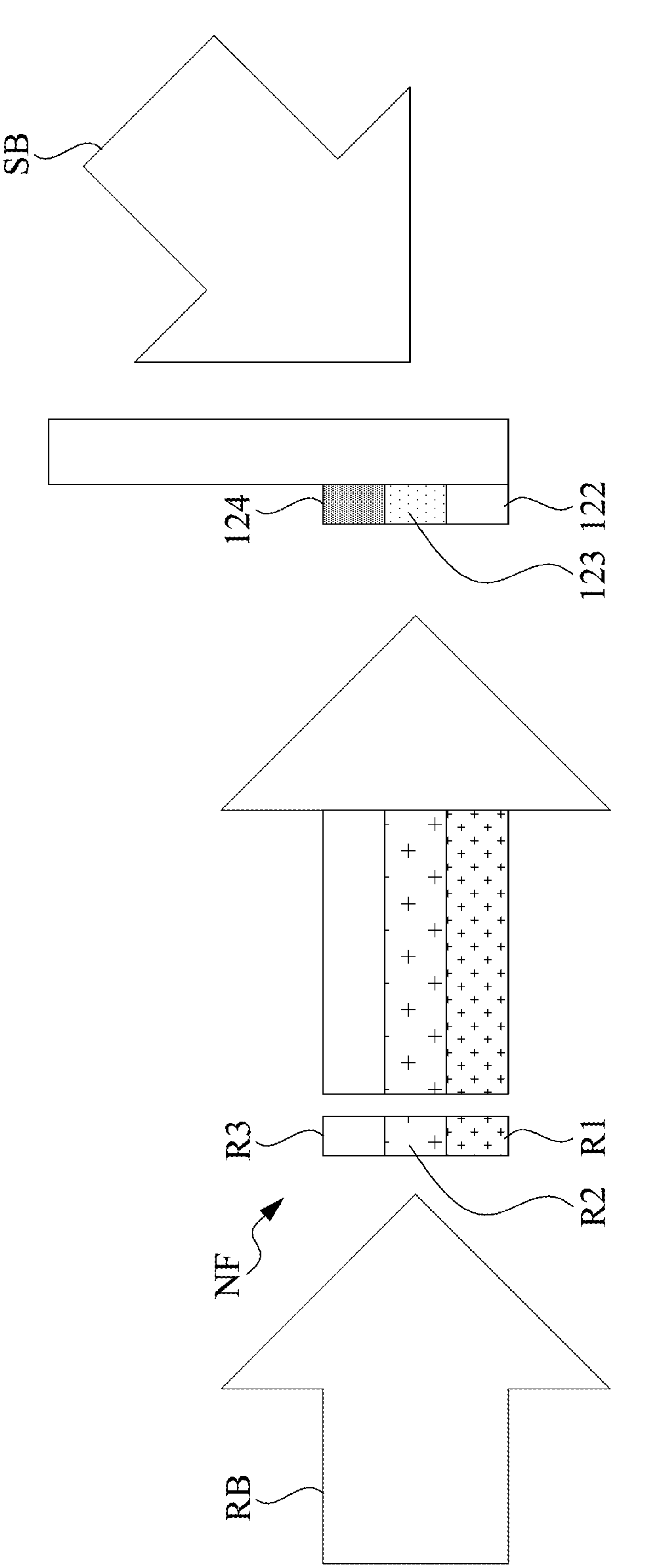
FIG. 2 is a schematic diagram illustrating a spatial stepped exposure method according to some embodiments of the present disclosure.

Reference is made to FIG. 2. FIG. 2 is a schematic diagram illustrating a spatial stepped exposure method according to some embodiments of the present disclosure. As shown in FIG. 2, in some embodiments, a photopolymer is exposed with two light beams (i.e., a reference beam RB and a signal beam SB) of the red light R, the green light G, or the blue light B in difference incidence directions from the opposite sides of the photopolymer. The photopolymer may include monomer, polymer, photo-initiator, and binder. When the photopolymer is subjected to an exposure process, the photo-initiator receives photons to generate radicals, so that the monomers begin to polymerize (i.e., polymerization). By using the exposure method of hologram interference fringe, the monomer that is not illuminated by the light (i.e., in dark zone) is diffused to the light irradiation zone (i.e., bright zone) and polymerized, thereby causing a non-uniform concentration gradient of the polymer. And finally, after fixing, phase gratings (i.e., the holographic gratings of the second diffractive element 122, the third diffractive element 123, and the fourth diffractive element 124) each including bright and dark stripes can be formed, and the photopolymer is transformed to a combination of the second diffractive element 122, the third diffractive element 123, and the fourth diffractive element 124.

In some embodiments, a volume holographic grating can form a transmissive holographic grating or a reflective holographic grating according to different manufacturing methods. Specifically, as shown in FIG. 2, by exposing the photopolymer with the reference beam RB and the signal beam SB in difference incidence directions from the opposite sides of the photopolymer, the second diffractive element 122, the third diffractive element 123, and the fourth diffractive element 124 can be manufactured as reflective diffractive elements (i.e., the holographic gratings of the second diffractive element 122, the third diffractive element 123, and the fourth diffractive element 124 are reflective holographic gratings). In some other embodiments, by exposing the photopolymer with the reference beam RB and the signal beam SB in difference incidence directions from the same side of the photopolymer, the second diffractive element 122, the third diffractive element 123, and the fourth diffractive element 124 can be manufactured as transmissive diffractive elements (i.e., the holographic gratings of the second diffractive element 122, the third diffractive element 123, and the fourth diffractive element 124 are transmissive holographic gratings).

A shown in FIG. 1, in some embodiments, the first diffractive element 121 is a reflective diffractive element, but the present disclosure is not limited in this regard. In some other embodiments, the first diffractive element 121 may be a transmissive diffractive element.

Figure 5:
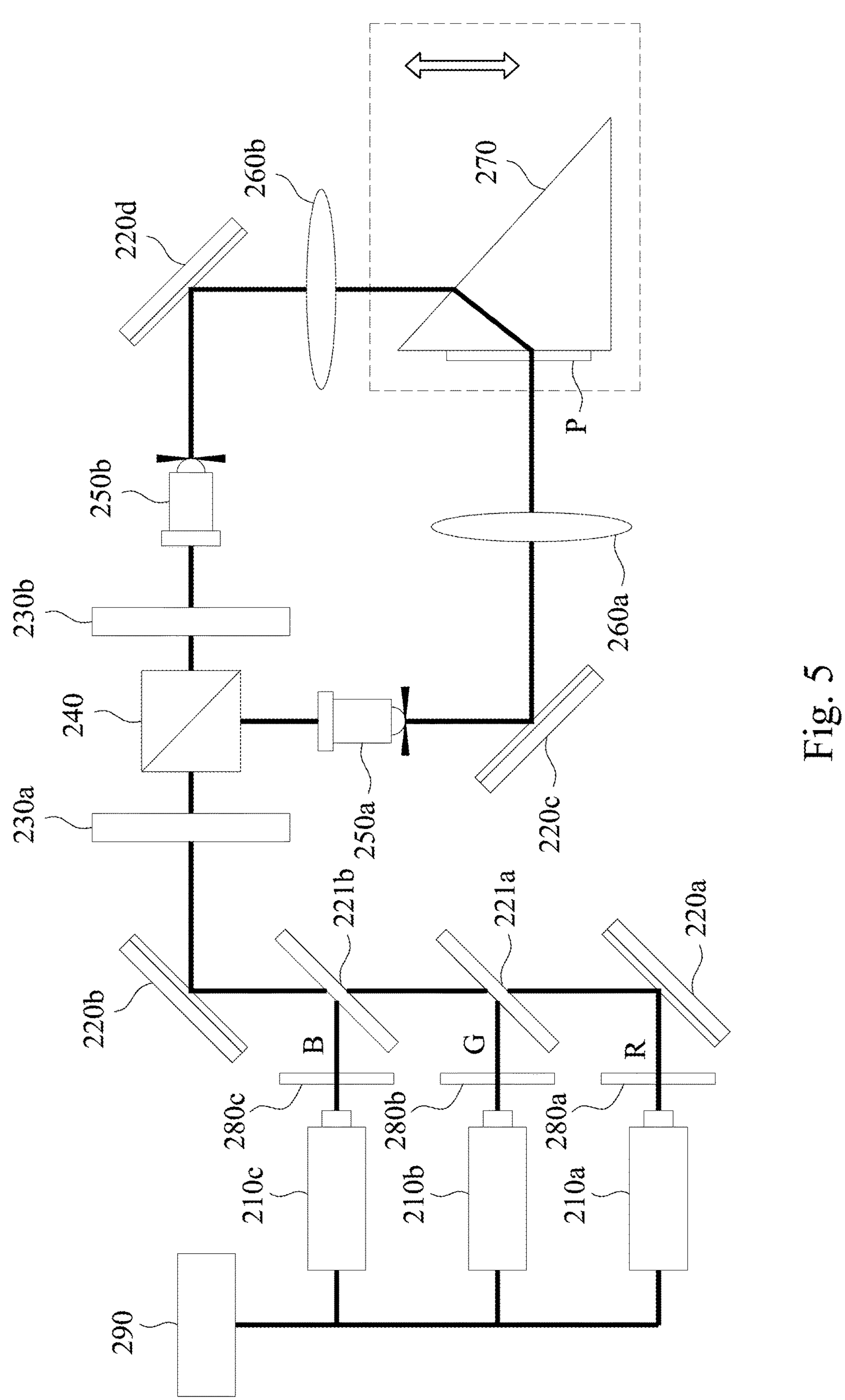
FIG. 5 is a schematic diagram of an optical exposure system according to some embodiments of the present disclosure.

Through the above description, it is clear that the holographic gratings can be formed through a photochemical reaction mechanism and established through a dual-light interference exposure system (e.g., the optical exposure system 200 as shown in FIG. 5). The sum of the energies of the reference beam RB and the signal beam SB is the total light intensity. In some embodiments, the ratio of the light intensities of the reference beam RB and the signal beam SB is 1:1. Alternatively, the ratio of the light intensities can also be determined by the fringe visibility, which is defined as the following equation (1).

$$\text{Fringe visibility} = \left[2\left(I_{ref}/I_{sig}\right)^{\frac{1}{2}}/1 + \left(I_{ref}/I_{sig}\right)\right] \tag{1}$$

In the above equation (1), $I_{ref}$ represents the light intensity of the reference beam RB and $I_{sig}$ represents the light intensity of the signal beam SB.

Alternatively, a specific ratio that conforms to the holographic interference rule can also be used, and the present disclosure is not limited in this regard.

After determining the total light intensity of the reference beam RB and the signal beam SB, the exposure time is controlled to reach the dosage required by the holographic photosensitive material (i.e., the photopolymer). When the required dosages of photopolymer are reached, the gratings are formed. The dosages can be calculated by the following equation (2).

$$\text{Dosage}\ (\text{mJ/cm}^2) = \text{Power density}\ (\text{mW/cm}^2) \times \text{Exposure time}\ (s) \tag{2}$$

Figure 3:
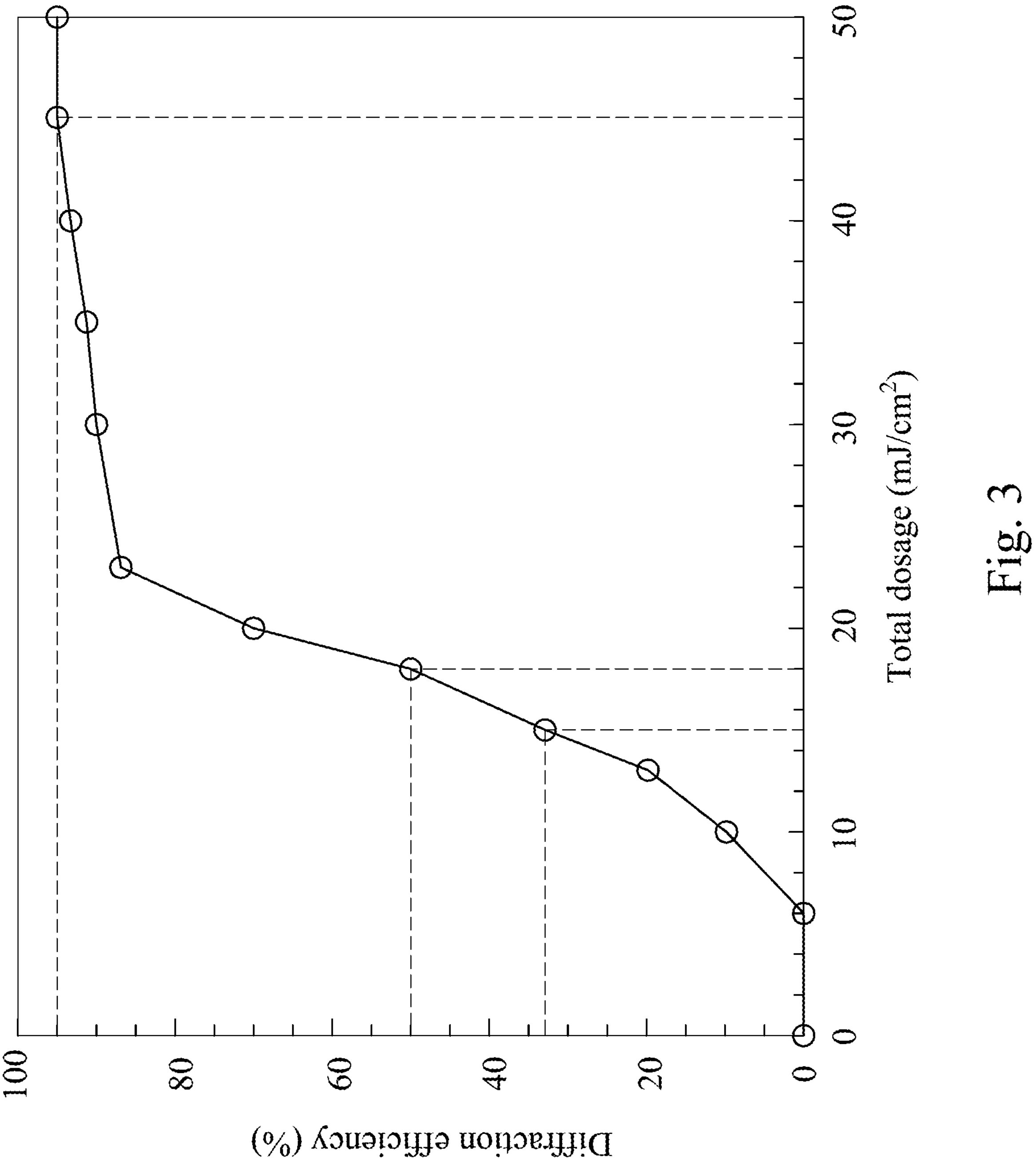
FIG. 3 is a graph showing the relationship between the total dosage received by a photopolymer and the diffraction efficiency of the photopolymer.

Reference is made to FIG. 3. FIG. 3 is a graph showing the relationship between the total dosage received by the photopolymer and the diffraction efficiency of the photopolymer. It should be pointed out that the graph is obtained by exposing the photopolymer to the reference beam RB and the signal beam SB of the blue light B for example.

For example, the diffraction efficiencies of the second diffractive element 122, the third diffractive element 123, and the fourth diffractive element 124 are about 33%, 50%, and 99%, respectively. Compared with the graph in FIG. 3, it can be known that the exposure dosages needed by the second diffractive element 122, the third diffractive element 123, and the fourth diffractive element 124 are 15 mJ/cm$^2$, 18 mJ/cm$^2$, and 45 mJ/cm$^2$, respectively.

As shown in FIG. 2, in some embodiments, each of the reference beam RB and the signal beam SB may be modulated to have a flat-top intensity distribution. A stepped neutral density filter NF is disposed in front of the photopolymer. A side of the photopolymer is exposed to the reference beam RB via the stepped neutral density filter NF, and another side of the photopolymer is exposed to the signal beam SB. The light transmittances of three gradient intervals of the stepped neutral density filter NF can be determined by the following equation (3).

$$\text{Dosage} = \frac{(Power_{Reference} \times \eta) + (Power_{Signal})}{\pi \times r^2} \times \text{exposure time} \tag{3}$$

In the above equation (3), $\text{Power}_{Reference}$ represents the power of the reference beam RB, $\text{Power}_{Signal}$ represents the power of the signal beam SB, η represents the light transmittance, and r represents the exposure radius. In an example, $\text{Power}_{Reference}$ and $\text{Power}_{Signal}$ may be 18 mW and 50 mW, respectively, r is 1.6 mm, and the exposure time is 5.5 seconds. According to the equation (3), the light transmittances of three gradient intervals of the stepped neutral density filter NF which are 8%, 17%, and 96% can be obtained. Therefore, through this spatial stepped exposure method, the holographic photosensitive material can be exposed to different dosages in different regions, and finally the second diffractive element 122, the third diffractive element 123, and the fourth diffractive element 124 with a gradient change in diffraction efficiency can be obtained.

Figure 4:
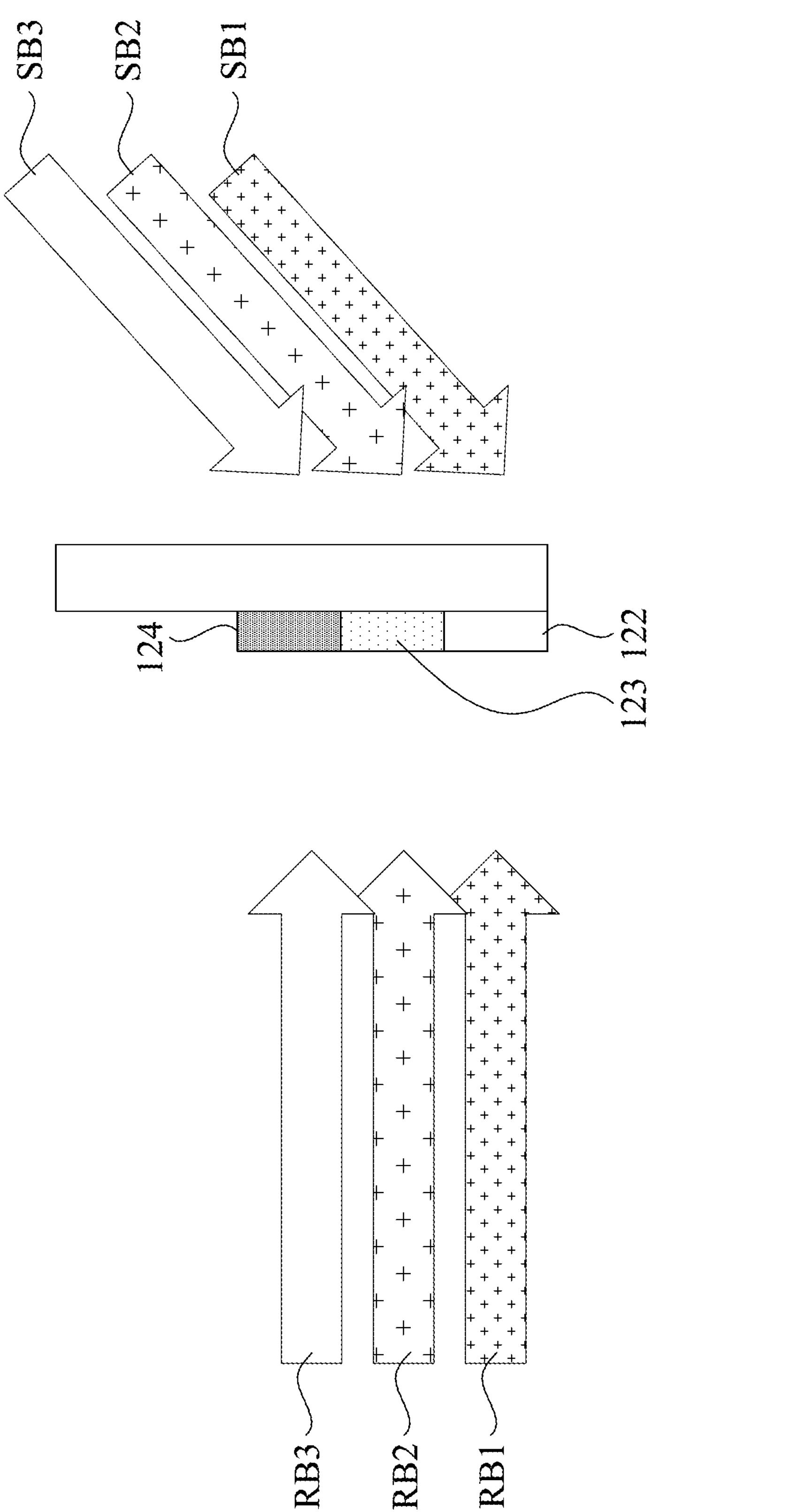
FIG. 4 is a schematic diagram illustrating a sequential stepped exposure method according to some embodiments of the present disclosure.

Reference is made to FIG. 4. FIG. 4 is a schematic diagram illustrating a sequential stepped exposure method according to some embodiments of the present disclosure. As shown in FIG. 4, the second diffractive element 122 can be formed by exposing to a reference beam RB1 and a signal beam SB1, the third diffractive element 123 can be formed by exposing to a reference beam RB2 and a signal beam SB2, and the fourth diffractive element 124 can be formed by exposing to a reference beam RB3 and a signal beam SB3. The exposure sequence of the second diffractive element 122, the third diffractive element 123, and the fourth diffractive element 124 can be flexibly adjusted as needed.

Reference is made to FIG. 5. FIG. 5 is a schematic diagram of an optical exposure system 200 according to some embodiments of the present disclosure. As shown in FIG. 5, the optical exposure system 200 includes three light sources 210*a*, 210*b*, 210*c* configured to emit the red light R, the green light G, and the blue light B, respectively. In some embodiments, the wavelength band of the red light R projected by the light sources 210*a* is about 633 nm, but the disclosure is not limited in this regard. In some embodiments, the wavelength band of the green light G projected by the light sources 210*b* is about 532 nm, but the disclosure is not limited in this regard. In some embodiments, the wavelength band of the blue light B projected by the light sources 210*c* is about 457 nm, but the disclosure is not limited in this regard. In some embodiments, the light sources 210*a*, 210*b*, 210*c* may be laser diodes, but the disclosure is not limited in this regard.

As shown in FIG. 5, the optical exposure system 200 further includes four reflective mirrors 220*a*, 220*b*, 220*c*, 220*d*, two dichroic mirrors 221*a*, 221*b*, two half-wave plates 230*a*, 230*b*, a polarizing beam splitter 240, two spatial filters 250*a*, 250*b*, two lenses 260*a*, 260*b*, a prism 270, and three light valves 280*a*, 280*b*, 280*c*. The light valve 280*a* is optically coupled between the light source 210*a* and the reflective mirror 220*a*. The light valve 280*b* is optically coupled between the light source 210*b* and the dichroic mirror 221*a*. The light valve 280*c* is optically coupled between the light source 210*c* and the dichroic mirror 221*b*. The dichroic mirrors 221*a*, 221*b* are optically coupled between the reflective mirrors 220*a*, 220*b* sequentially. The half-wave plate 230*a* is optically coupled between the reflective mirror 220*b* and the polarizing beam splitter 240. A photopolymer P is attached to a side of the prism 270. The polarizing beam splitter 240 is optically coupled to the prism 270 sequentially via the spatial filter 250*a*, the reflective mirror 220*c*, the lens 260*a*, and the photopolymer P. The polarizing beam splitter 240 is further optically coupled to the prism 270 sequentially via the half-wave plate 230*b*, the spatial filter 250*b*, the reflective mirror 220*d*, and the lens 260*b*.

Specifically, the light valves 280*a*, 280*b*, 280*c* are configured to respectively allow the red light R, the green light G, and the blue light B to pass through. The dichroic mirror 221*a* is configured to transmit the red light R and reflect the green light G. The dichroic mirror 221*b* is configured to transmit the red light R and the green light G and reflect the blue light B. Under the optical configurations of the optical exposure system 200 as shown in FIG. 5, two light beams of the red light R will be generated to reach opposite sides of the photopolymer P when the light source 210*a* emits the red light R and the light valve 280*a* allows the red light R pass through, two light beams of the green light G will be generated to reach the opposite sides of the photopolymer P when the light source 210*b* emits the green light G and the light valve 280*b* allows the green light G pass through, and two light beams of the blue light B will be generated to reach the opposite sides of the photopolymer P when the light source 210*c* emits the blue light B and the light valve 280*c* allows the blue light B pass through. A combination of the light source 210*a* and the light valve 280*a* may be regarded as a red light-emitting module, a combination of the light source 210*b* and the light valve 280*b* may be regarded as a green light-emitting module, and a combination of the light source 210*c* and the light valve 280*c* may be regarded as a blue light-emitting module.

In some embodiments, the light valves 280*a*, 280*b*, 280*c* are shutters, but the disclosure is not limited in this regard.

In some embodiments, as shown in FIG. 5, the optical exposure system 200 further includes a controller 290. The controller 290 is electrically connected to the light sources 210*a*, 210*b*, 210*c*, and is configured to control the light sources 210*a*, 210*b*, 210*c* to emit the red light R, the green light G, and the blue light B, respectively.

In some other embodiments, the light valves 280*a*, 280*b*, 280*c* in FIG. 5 may be omitted. In other words, light source 210*a* may be regarded as a red light-emitting module, the light source 210*b* may be regarded as a green light-emitting module, and the light source 210*c* may be regarded as a blue light-emitting module.

In some embodiments, each of the second diffractive element 122, the third diffractive element 123, and the fourth diffractive element 124 may be formed with three holographic gratings of the red light R, the green light G, and the blue light B intersect each other. For example, to obtain the second diffractive element 122 with the diffraction efficiency of 33%, the required dosage of the red light R may be about 7 mJ/cm$^2$, the required dosage of the green light G may be about 15 mJ/cm$^2$, and the required dosage of the blue light B may be about 18 mJ/cm$^2$. To obtain the third diffractive element 123 with the diffraction efficiency of 50%, the required dosage of the red light R may be about 10 mJ/cm$^2$, the required dosage of the green light G may be about 18 mJ/cm$^2$, and the required dosage of the blue light B may be about 30 mJ/cm$^2$. To obtain the fourth diffractive element 124 with the diffraction efficiency of 99%, the required dosage of the red light R may be about 24 mJ/cm$^2$, the required dosage of the green light G may be about 45 mJ/cm$^2$, and the required dosage of the blue light B may be about 50 mJ/cm$^2$.

As shown in FIG. 5, in some embodiments, to perform the sequential stepped exposure method, the prism 270 on which the photopolymer P is attached is movable in a direction (e.g., the vertical direction in FIG. 5). For example, with reference to FIG. 4, the photopolymer P is exposed to a reference beam RB1 and a signal beam SB1 at the same time to form at least one holographic grating of the second diffractive element 122. Afterwards, the prism 270 moves down in the direction, and then the photopolymer P is exposed to a reference beam RB2 and a signal beam SB2 at the same time to form at least one holographic grating of the third diffractive element 123. Afterwards, the prism 270 further moves down in the direction, and then the photopolymer P is exposed to a reference beam RB3 and a signal beam SB3 at the same time to form at least one holographic grating of the fourth diffractive element 124.

Figure 6:
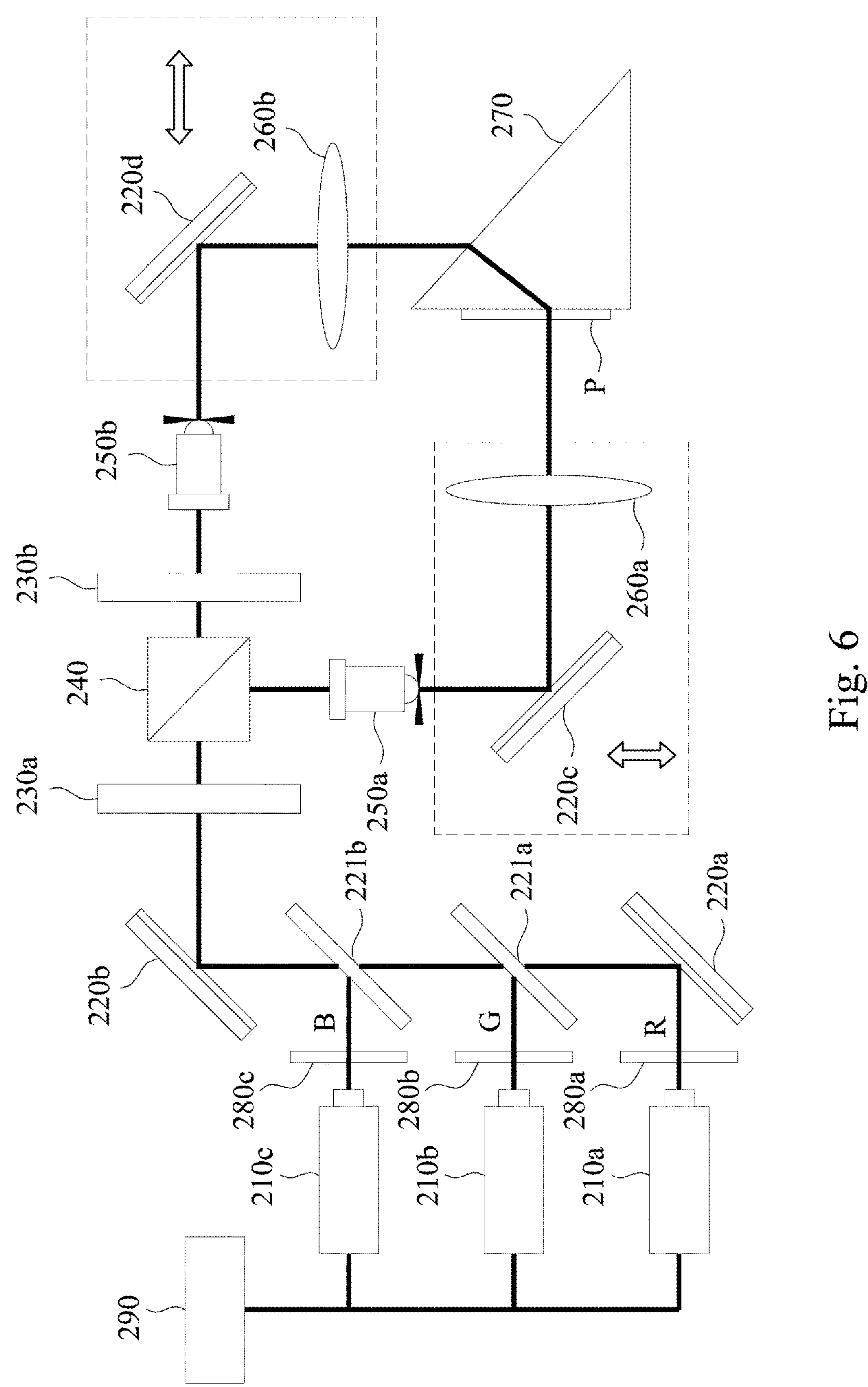
FIG. 6 is a schematic diagram of an optical exposure system according to some embodiments of the present disclosure.

Reference is made to FIG. 6. FIG. 6 is a schematic diagram of an optical exposure system 300 according to some embodiments of the present disclosure. The optical exposure system 300 includes all the components of the optical exposure system 200 shown in FIG. 5. To perform the sequential stepped exposure method, the prism 270 of the optical exposure system 300 is stationary, a first combination of the reflective mirror 220*c* and the lens 260*a* is movable in a first direction (e.g., the vertical direction in FIG. 6), and a second combination of the reflective mirror 220*d* and the lens 260*b* is movable in a second direction (e.g., the horizontal direction in FIG. 6). For example, with reference to FIG. 4, the photopolymer P is exposed to a reference beam RB1 and a signal beam SB1 at the same time to form at least one holographic grating of the second diffractive element 122. Afterwards, the first combination moves up in the first direction and the second combination moves left in the second direction, and then the photopolymer P is exposed to a reference beam RB2 and a signal beam SB2 at the same time to form at least one holographic grating of the third diffractive element 123. Afterwards, the first combination further moves up in the first direction and the second combination further moves left in the second direction, and then the photopolymer P is exposed to a reference beam RB3 and a signal beam SB3 at the same time to form at least one holographic grating of the fourth diffractive element 124.

In some embodiments, the second diffractive element 122, the third diffractive element 123, and the fourth diffractive element 124 are sequentially formed. Specifically, the formation of the third diffractive element 123 is performed after the formation of the three holographic gratings of the second diffractive element 122 are finished, and then the formation of the fourth diffractive element 124 is performed after the formation of the three holographic gratings of the third diffractive element 123 are finished.

In some embodiments, the holographic gratings of the red light R, the green light G, and the blue light B are sequentially formed. Specifically, the formation of the holographic gratings of the green light G of the second diffractive element 122, the third diffractive element 123, and the fourth diffractive element 124 is performed after the formation of the three holographic gratings of the red light R are finished, and the formation of the holographic gratings of the blue light B is performed after the formation of the three holographic gratings of the green light G finished.

According to the foregoing recitations of the embodiments of the disclosure, it can be seen that in some embodiments of the waveguide device and the optical engine of the present disclosure, the diffraction efficiencies of the second diffractive element and the third diffractive element increase as the energy of the totally reflected light decreases. In this way, the second diffractive element and the third diffractive element having different diffraction efficiencies can provide a wider eyebox range, and this range can provide a more uniform light intensity. It allows users to see uniformly bright and dark image content when laterally moving their eyes relative to the waveguide device and the optical engine.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A waveguide device, comprising:

a first diffractive element configured to diffract light of a wavelength to propagate with a diffraction angle;

a second diffractive element configured to diffract the light of the wavelength to propagate with the diffraction angle and diffract light of another wavelength;

a third diffractive element configured to diffract the light of the wavelength to propagate with the diffraction angle and diffract the light of the another wavelength; and a waveguide element configured to guide the light of the wavelength to propagate from the first diffractive element to the second diffractive element and the third diffractive element, wherein diffraction efficiencies of the second diffractive element and the third diffractive element are different, wherein each of the second diffractive element and the third diffractive element has different holographic gratings intersecting each other.

2. The waveguide device of claim 1, wherein the first diffractive element is spaced apart from the second diffractive element and the third diffractive element.

3. The waveguide device of claim 1, wherein a distance between the first diffractive element and the second diffractive element is smaller than a distance between the first diffractive element and the third diffractive element, and the diffraction efficiency of the second diffractive element is smaller than the diffraction efficiency of the third diffractive element.

4. The waveguide device of claim 1, wherein the waveguide element has opposite sides, the first diffractive element is disposed on one of the opposite sides, and the second diffractive element and the third diffractive element are disposed on another of the opposite sides.

5. The waveguide device of claim 4, wherein the first diffractive element, the second diffractive element, and the third diffractive element are reflective diffractive elements.

6. The waveguide device of claim 1, further comprising a fourth diffractive element configured to diffract the light of the wavelength to propagate with the diffraction angle, wherein the second diffractive element, the third diffractive element, and the fourth diffractive element are disposed on a surface of the waveguide element and sequentially arranged along a direction, and the diffraction efficiency of the third diffractive element is greater than the diffraction efficiency of the second diffractive element and smaller than a diffraction efficiency of the fourth diffractive element.

7. The waveguide device of claim 6, wherein the third diffractive element is in contact with the second diffractive element and the fourth diffractive element.

8. An optical engine, comprising:

a projector configured to project light of a wavelength;

a first diffractive element configured to diffract the light of the wavelength to propagate with a diffraction angle;

a second diffractive element configured to diffract the light of the wavelength to propagate with the diffraction angle and diffract light of another wavelength;

a third diffractive element configured to diffract the light of the wavelength to propagate with the diffraction angle and diffract the light of the another wavelength; and a waveguide element configured to guide the light of the wavelength to propagate from the first diffractive element to the second diffractive element and the third diffractive element, wherein diffraction efficiencies of the second diffractive element and the third diffractive element are different, wherein each of the second diffractive element and the third diffractive element has different holographic gratings intersecting each other.

9. The optical engine of claim 8, wherein the first diffractive element is spaced apart from the second diffractive element and the third diffractive element.

10. The optical engine of claim 8, wherein a distance between the first diffractive element and the second diffractive element is smaller than a distance between the first diffractive element and the third diffractive element, and the diffraction efficiency of the second diffractive element is smaller than the diffraction efficiency of the third diffractive element.

11. The optical engine of claim 8, wherein the light diffracted by the first diffractive element sequentially reaches the second diffractive element and the third diffractive element through the waveguide element, and the diffraction efficiency of the second diffractive element is smaller than the diffraction efficiency of the third diffractive element.

12. The optical engine of claim 8, wherein the waveguide element has opposite sides, the first diffractive element is disposed on one of the opposite sides, and the second diffractive element and the third diffractive element are disposed on another of the opposite sides.

13. The optical engine of claim 12, wherein the first diffractive element, the second diffractive element, and the third diffractive element are reflective diffractive elements.

14. The optical engine of claim 8, further comprising a fourth diffractive element configured to diffract the light of the wavelength to propagate with the diffraction angle, wherein the second diffractive element, the third diffractive element, and the fourth diffractive element are disposed on a surface of the waveguide element and sequentially arranged along a direction, and the diffraction efficiency of the third diffractive element is greater than the diffraction efficiency of the second diffractive element and smaller than a diffraction efficiency of the fourth diffractive element.

15. The optical engine of claim 14, wherein the third diffractive element is seamlessly connected to the second diffractive element and the fourth diffractive element.

16. The optical engine of claim 14, wherein the light diffracted by the first diffractive element sequentially reaches the second diffractive element, the third diffractive element, and the fourth diffractive element through the waveguide element.

17. The optical engine of claim 8, wherein the light projected by the projector reaches the first diffractive element through the waveguide element, and the light reaching the first diffractive element is diffracted by the first diffractive element to sequentially reach the second diffractive element and the third diffractive element.

* * * * *